March 28, 1944.   B. L. SMITH   2,344,951
PHOTOGRAPHIC FILM HOLDER
Filed May 22, 1942    4 Sheets-Sheet 1

INVENTOR.
Byron L. Smith
BY
his ATTORNEYS

March 28, 1944.  B. L. SMITH  2,344,951
PHOTOGRAPHIC FILM HOLDER
Filed May 22, 1942  4 Sheets-Sheet 2

INVENTOR.
Byron L. Smith
BY
his ATTORNEYS

March 28, 1944. B. L. SMITH 2,344,951
PHOTOGRAPHIC FILM HOLDER
Filed May 22, 1942 4 Sheets-Sheet 3

INVENTOR.
Byron L. Smith
BY
his ATTORNEYS.

March 28, 1944.   B. L. SMITH   2,344,951
PHOTOGRAPHIC FILM HOLDER
Filed May 22, 1942   4 Sheets-Sheet 4

INVENTOR.
Byron L. Smith
BY
his ATTORNEYS

Patented Mar. 28, 1944

2,344,951

UNITED STATES PATENT OFFICE 2,344,951

PHOTOGRAPHIC FILM HOLDER

Byron L. Smith, East Rochester, N. Y., assignor to The Folmer Graflex Corporation, Rochester, N. Y., a corporation of Delaware Application May 22, 1942, Serial No. 444,009

35 Claims. (Cl. 95—66)

This invention relates to a new photographic film holder of molded plastic construction, and is an improvement on the application of myself and Vernon E. Whitman, Ser. No. 442,774, filed May 13, 1942.

In order that the principle of the present invention may be readily understood, I have disclosed a single embodiment thereof in the accompanying drawings, wherein—

The film holder, of which the preferred embodiment is herein disclosed, is particularly adapted to quick-work photography, that is, with the shortest possible time lapse between the making of an exposure and the drying of the developed negative. Since the holder is constructed wholly of plastic material and with non-corrosion metal rivets, the holder, loaded with sensitized material, can be submerged in a tank of developer and then transferred to the washer, then into the fixing solution, and then into a final wash. This entire process can be conducted in daylight, as the holder slides are not withdrawn until after the holder has been removed from the fixing solution. Moreover, the construction is such that the holder can be quickly washed and dried for reloading.

While the principal object of the invention is to provide a holder that can be made up of substantially flat sections that are easy to mold and in which very accurate dimensional tolerances can be held, other objects of the invention are: to provide a holder simple in construction that can be submerged in photographic solution without harm to the holder; to provide a holder that permits rapid entering and draining of the photographic solution; to provide for the rapid, effective flow of the liquids to both faces of the film, through the bottom of the holder in an upward direction, thus expelling all air and preventing any air pockets; to provide a holder that can be quickly loaded or unloaded in total darkness and without removing the dark slides; to provide a holder having valves for closing off the liquid flow channels when the holder is not in one of the several solutions, to assure light tightness and to prevent dust reaching the sensitized material; to provide simple and rapid means for controlling these valves; to provide a holder wherein the light valves may be readily replaced when they become worn; and to provide a holder applicable to existing cameras without modification of the camera.

While I have above referred to the film holder as of molded plastic material and while I shall in the detailed description refer to certain parts as castings, I desire it distinctly to be understood that the holder may be formed of any suitable material in any suitable manner. Desirably, however, the parts hereinafter referred to as the main frame casting and the two face castings are desirably molded, pressed or formed of plastic material.

Figures 1, 2:
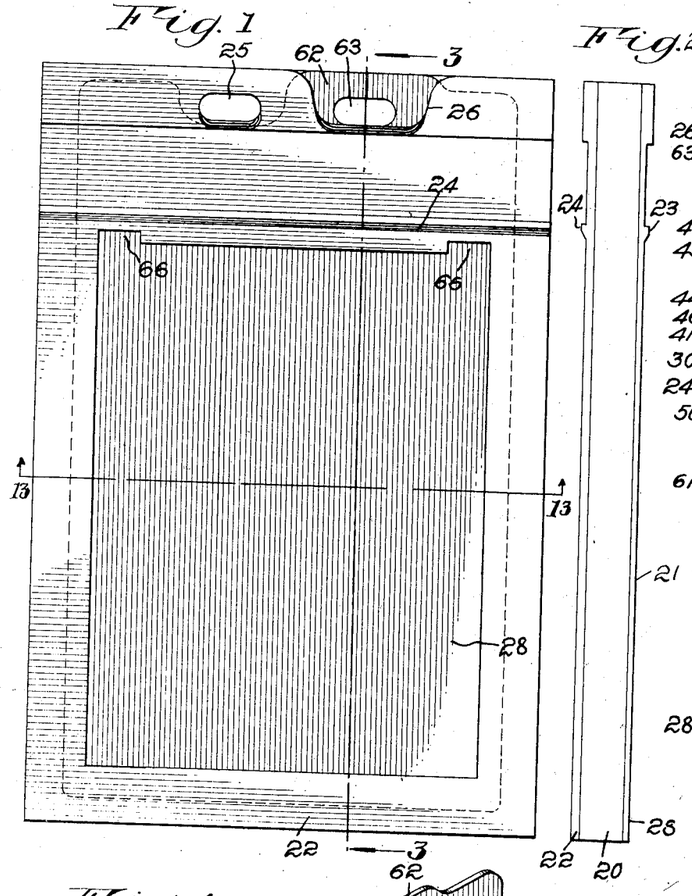
Fig. 1 is a front elevation of the holder with both dark slides in position.
Fig. 2 is a right hand elevation of Fig. 1.
Figure 3:
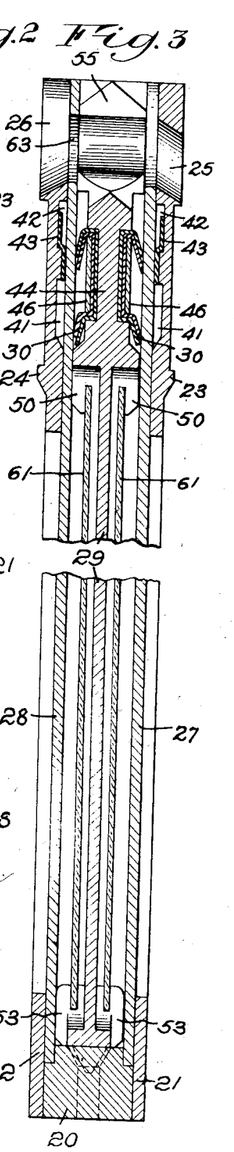
Fig. 3 is a vertical section taken through Fig. 1 on the line 3—3 thereof.
Figure 4:
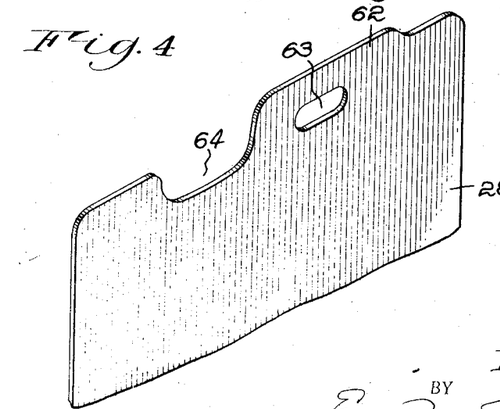
Fig. 4 is a fragmentary isometric view of one of the dark slides.

Referring first to Figs. 1, 2 and 3, the complete holder, with the dark slides in place, is shown in front elevation in Fig. 1. The main or body frame of the casting is indicated at 20, and attached thereto on the right hand and left hand sides respectively, viewing Fig. 2, are the face casting or member 21 and the face casting or member 22, both hereinafter referred to as face castings for convenience of description. Said face castings 21, 22 have the usual light-lock projections 23, 24 respectively and each has openings 25, 26 at the upper end. The holder is fitted with the usual dark slides 27, 28, and with a central film-supporting member 29 having light traps or valves 30, 30.

Figures 5, 6, 7, 8, 9:
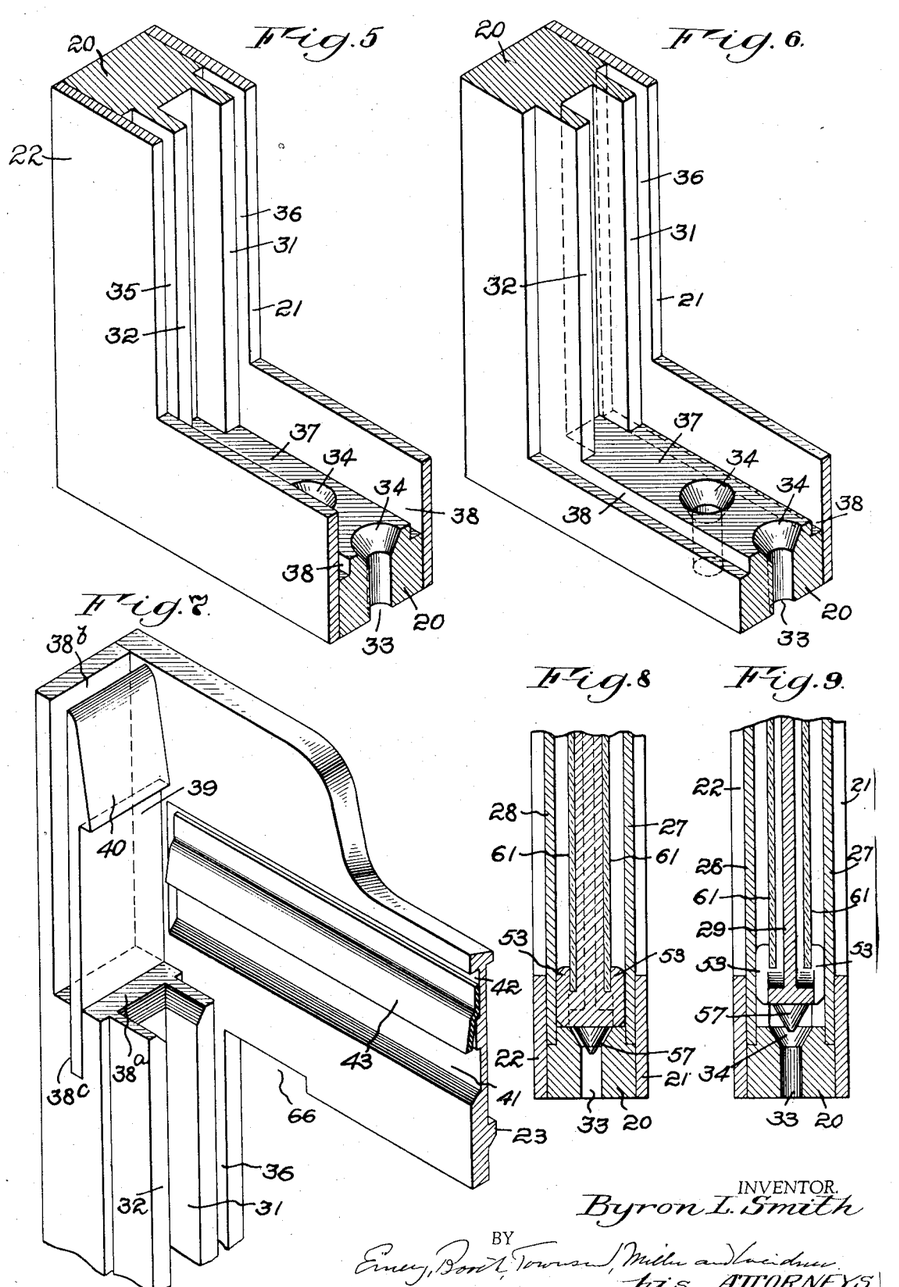
Fig. 5 is an isometric view, partially in section, of one of the lower corners of the holder, showing the construction thereof and of certain liquid passages or openings.
Fig. 6 is an isometric view similar to Fig. 5, one of the outer members having been removed.
Fig. 7 is an isometric view, partially in section of one of the upper corners of the holder and showing one retaining latch of the central member.
Fig. 8 is a partial vertical section through the holder, taken on the line 8—8 of Fig. 14, and showing the drainage or flow controlling valves closed.
Fig. 9 is a partial vertical section through the holder, taken on the line 9—9 of Fig. 15 and showing the drainage or flow controlling valves open.

In Figs. 5 to 9 are shown several sections of the holder at different portions thereof so as clearly to disclose the entire structure of the holder. Therein the said main casting 20 is provided interiorly with two lengthwise extending, slightly spaced, parallel ribs 31, 32 respectively, on both the left and right hand sides of the main body casting 20 from the lower end to points near the upper end thereof, as evident from Figs. 8, 14 and 15. Those at one side thereof are shown in Figs. 5, 6 and 7.

The lower portion of the body casting 20 is provided with a series of cylindrical liquid flow passages or openings 33 having countersunk enlargements 34. Such passages or openings 33 serve to provide for easy flow of the solution when the holders are placed in solution containers. In Fig. 6, the face casting 22 has been removed so as clearly to show the construction of the main or body casting 20. A space or slot 35 is formed between the face casting 22 and the rib 32 for the reception of one of the dark slides. A second slot 36 is formed between the longitudinal ridge 31 and the face casting 21 for the same purpose. The main or body casting 20 is provided with a transversely extending, raised rib formation 37 that provides slots 38, 38 between said rib 37 and the face castings 21, 22, the purpose of such slots being to receive the lower ends of the two dark slides.

In the upper end of the main or body casting 20 is formed, as shown in Fig. 7, a transversely extending step 38a from which rises a lengthwise extending wall 38b, and in the said step 38a is formed a groove or slot 38c, into which is fitted a latch member 39 having a hooked or dog-like formation 40, the purpose whereof will be subsequently set forth. The face castings 21, 22 are both provided with transversely extending grooves or depressions 41, 42, best shown in Fig. 7. In each of the depressions 42 is cemented or otherwise attached an outside light guard or trap 43, the purpose whereof is further to seal the film holder against the entrance of light around the front of the dark slide. The purpose of groove 41 is to provide a space that is to be occupied by the light trap or valve 30 when the dark slide 28 is removed, thus closing off all light from passing down through the opening into which dark slide 28 is fitted in position. The construction of the light trap or valve is best shown in Figs. 10 and 11 which are fragmentary views of the central film-supporting member indicated at 29.

Figure 11:
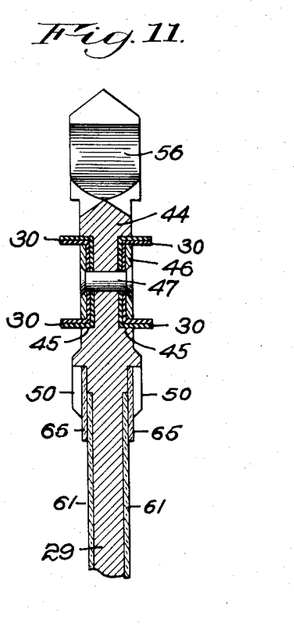
Fig. 11 is a vertical section through the upper part of the central member, and showing the light valves and also the sensitized material in place.

The upper end of the said central film-supporting member 29 is provided with a modified I-beam section indicated at 44, and having openings or channels 45, 45, best shown in Fig. 11, into which are fitted the said light traps or valves 30, 30, desirably made of synthetic rubber or some other suitable material. The said light valves 30, 30 are held in place by means of retaining non-corroding strips 46, 46 and rivets 47, 47 of suitable non-corroding material, passing through the retaining strips 46, 46, the light valves 30, 30 and the I-beam section 44.

Figures 10, 12:
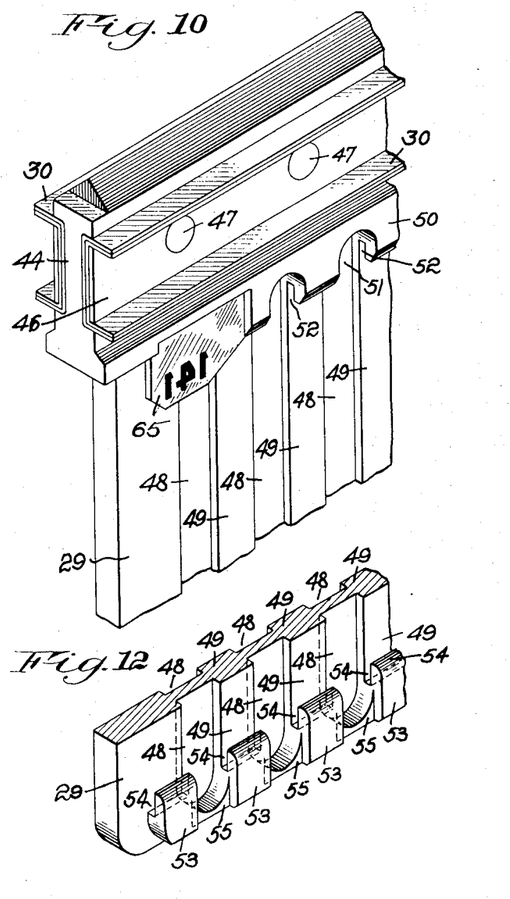
Fig. 10 is a fragmentary isometric view of one upper corner of the central member.
Fig. 12 is an isometric fragmentary view of one of the lower corners of the central member, showing the construction of the liquid flow and drainage channels and the film holding means.

Referring particularly to Figs. 10, 11 and 12, the main body of the central film-supporting member 29, as best shown in Figs. 10, 11 and 12, is provided with a series of vertical or lengthwise extending grooves 48, 48 constituting liquid-flow channels that form intervening ribs 49, 49, against which the sensitized film material is placed. Between the said I-beam formation and the ribbed parts of the central film-supporting member 29 are formed, at both faces of said member, the upper film-retaining transverse formations 50 provided with a series of preferably semi-circular openings or recesses 51, and at the upper ends of the ribs 49 are provided preferably rectangular slots 52, 52 to engage the upper end or edge of the sensitized film material in such manner that the inflowing liquid flows upwardly effectively to both faces of each sensitized film, without the formation of any air pockets.

Figure 13:
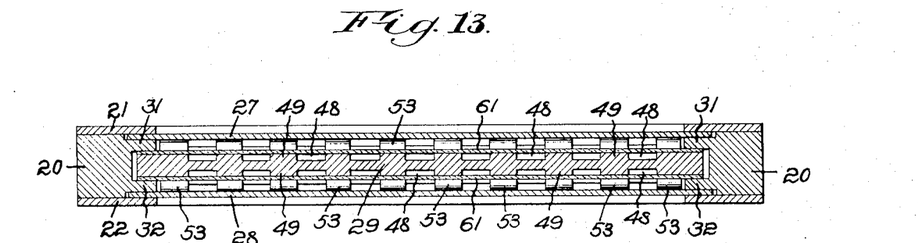
Fig. 13 is a horizontal section through Fig. 1 on the line 13—13 thereof, showing the several parts of the holder, with the sensitized material in place.

The lower end of the central film-supporting member 29 is provided with a similar formation or structure, herein shown in Figs. 12 and 13 as a series of hook-shaped formations 53, 53 and best shown in Fig. 12 as having grooves 54, 54 for receiving the lower end or edge of the sensitized material in such manner that the inflowing liquid effectively flows completely over both faces of each sensitized film. Between said hook-shaped formations 53, 53 are formed shallow channels 55, 55 to allow the passage of the developing solution around the lower end of the central film-supporting member 29. To the upper channel formation or I-beam section 44 is attached a suitable knob or handle 56, best shown in Fig. 11, which may be of any suitable form, and which is for the purpose of manipulating the central film-supporting member 29.

Figure 14:
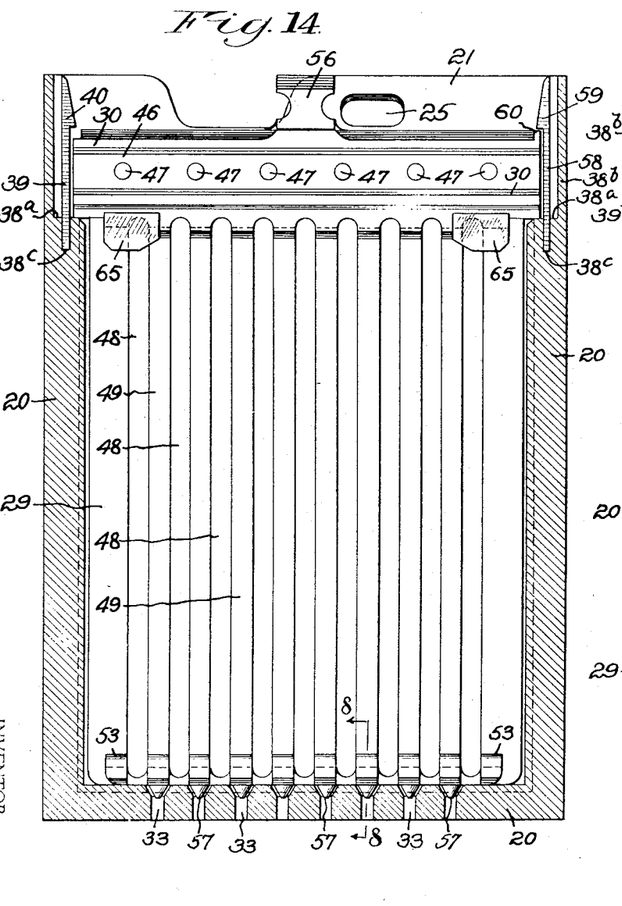
Fig. 14 is a vertical sectional view of the holder, one of the side members having been removed, and showing the position of the central member when the liquid flow channels are closed, the central member being held in position by one of the latches.
Figure 15:
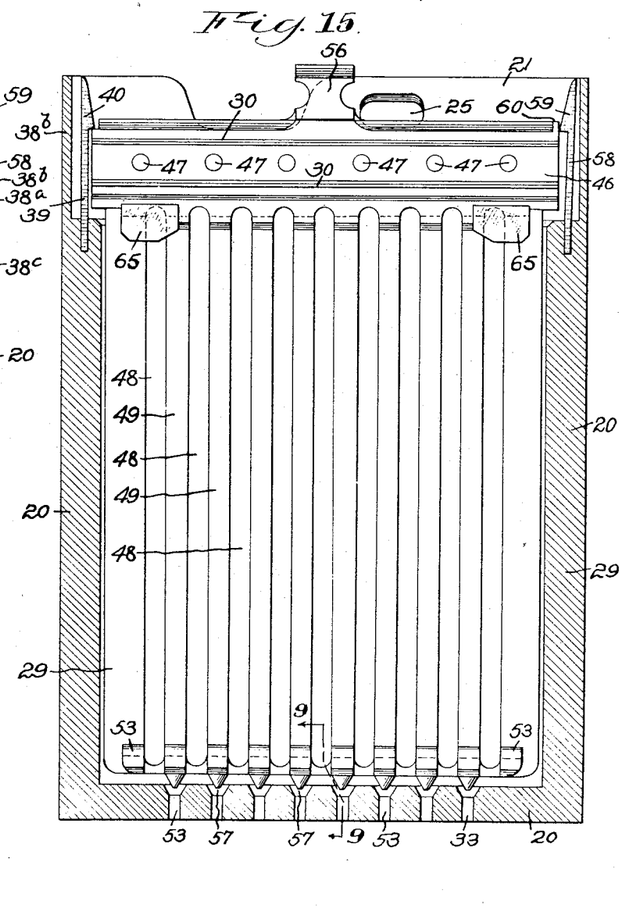
Fig. 15 is a view similar to Fig. 14, but the central member having been moved in an upward direction after first releasing the right hand latch and being engaged by the left hand latch, thus opening the liquid flow channels.

Referring next to Figs. 14 and 15, upon the lowermost end of said central film-supporting member 29 is formed a series of cone-shaped or tapered valve members 57, 57 that engage the countersunk enlargements 34, 34 of the said passages or openings 33, 33 for the purpose of closing such passages or openings 33 and excluding all dust or foreign matter that could otherwise pass through and settle on the sensitized film material. When the said central film-supporting member 29 is in its normal or down position, as shown in Fig. 14, all of the said passages or openings 33 will be closed and the central film-supporting member 29 will be held locked in such position by a spring-like latch member 58 mounted similarly to the latch member 39, but opposite thereto, as shown in Figs. 14 and 15, and having a hook 59 engaging an extension 60 of the I-beam shaped member 44. When the said latch member 58 is pressed to the right, viewing said figures, by the operator, the said central film-supporting member 29 can be partially withdrawn by lifting upon the knob or handle 56. The said central film-supporting member 29 will be stopped by the hook formation 40 of the latch member 39 when the said central film-supporting member 29 reaches the raised position shown in Fig. 15.

All the passages or openings 33, 33 will then be open and if the holder be placed in this condition in a tank containing a liquid, the holder will readily fill with that liquid which will reach all parts of the interior of the holder and completely surround the sensitized material when the latter is in place. In doing so, the channels 55 between the hook members 53 serve both to admit the inflowing liquid and subsequently to drain off such liquid. Thus they constitute fluid inflow or acceptance channels and drainage channels. Without them, the flow of the fluid would be prevented, as the fluid could not enter the holder and flow along both faces of the films, nor could the liquid subsequently drain from the holder. This is very evident from Figs. 8 and 9. When the valves 57 are open, the liquid rises in the cylindrical passages or openings 33 and flows up through the channels 55 formed between the hook members 53, and then along the channels or grooves 48 behind the sensitized films and fills the space provided between the sensitized films and the dark slides 28. When the holder is removed from the solution, the liquid drains out through the cylindrical passages or openings 33. After the holder is removed from the liquid and has been allowed to drain, the central film-supporting member 29 is again moved to its lower position, shown in Fig. 14, and is held in that position by the hook 59 of the latch member 58. In order to remove the central film-supporting member entirely from the holder, the knob or handle 56 is grasped by the operator and the hook 59 is pressed to the right viewing Fig. 15, and the central film-supporting member 29 is then moved to the position shown in Fig. 15. The hook or dog 40 is then pressed to the left, whereupon the movement of the central film-supporting member 29 can be continued until the said central film-supporting member is entirely withdrawn from the holder.

In order to load the holder, the central film-supporting member 29 is entirely withdrawn as just explained, and a sheet or film 61 of sensitized material, shown in Figs. 3, 11 and 13, is slightly bowed transversely with the sensitized surface on the convex side. Such film 61 is then laid down onto the ribs 49 of the central film-supporting member 29 and is thrust downward or flattened in a direction toward the said central film-supporting member 29. The upper end or edge of the said film 61 will be guided into the openings 52, 52 and the lower end or edge thereof will be guided into the grooves 54, 54. The film 61 will then lie flat on the said central film-supporting member 29 and may be moved in a lateral direction until the longitudinal edges of the film are aligned with the edges of the central film-supporting member 29. The same operation is carried out for loading the opposite side of the holder. The central film-supporting member 29 is then placed in the holder, being guided between the ribs 31 and 32 of the main body casting 20 and pushed all the way home. The said central film-supporting member will then be locked in place by the dog 59.

In order to make an exposure, the holder is placed in the camera in the usual manner and the appropriate dark slide of the holder is withdrawn.

The dark slides are of a formation to indicate whether or not the sensitized material under a slide has been exposed. Therefore, the construction of each of the slides is desirably as follows. On the upper right hand end of the dark slide 28 is formed a handle portion 62 having a hole 63. On the upper left hand end of the said dark slide 28 is a cut-out 64 of a shape corresponding to the opening 26 of the face casting 22. When the dark slide 28 is in the position shown in Fig. 1 (that is to say, with the handle 62 before the opening 26) this fact will indicate that the film holder is loaded with sensitized material but that such material has not yet been exposed. After an exposure is made, the said dark slide 28 is returned to the holder with the cut-out 64 aligned with the opening 26, thus indicating that the sensitized material has been exposed.

Referring to Figs. 1, 10 and 11, in order to identify the sensitized material as exposed in the holder herein disclosed, I have provided identifying tabs 65, 65 that are cemented or otherwise suitably secured to the film retaining formations 50, and in order to provide a clear passage for the light to pass through the said tabs 65, 65, the face castings 21, 22 are provided with notches 66, 66. When the sensitized material is in place within the holder, it will lie behind the tabs 65, 65, which may be provided with any suitable marking such as an opaque marking on a transparent tab or a stencil opening in an opaque tab. When the holder is in the camera and a dark slide is withdrawn to make an exposure, light passing through the lens will fall on the corresponding tab 65 and cause any data thereon to be recorded on the sensitized material itself.

My invention provides a novel photographic film or sensitized surface holder that has been completely reduced to practice and tested under very severe conditions, and the many points of advantage have been fully proved. The holder is of very simple construction, being in the disclosed embodiment thereof made up of three separate castings of which two are duplicates, and all of them are of very simple structure permitting their manufacture in relatively low cost molds. The construction is such that a very high degree of accuracy can be maintained with respect to the focal depth, i. e., the depth from the base of the holder to the sensitized material. This is of very great importance in view of the present common usage of large aperture lenses.

A very great advantage of the holder herein disclosed derives from the fact that it is made of material not affected by the developing and fixing solutions. Therefore the process of developing, fixing and washing can be fully carried out while the sensitized material is in place in the holder. This is a very important advantage when doing so-called quick-work photography, usually carried out in an airplane.

In the practice of my invention a photograph is made and the holder is removed from the camera, the operator having first replaced the dark slide. The holder is then placed in a developing tank and the valves in the bottom of the holder are opened, allowing the developer to flow up through the holder. After a sufficient time has elapsed for development, the holder is transferred to a short-stop bath, then to a fixing bath, and then to a wash bath. The negative is then removed and is printed while still wet.

In the practice of my invention completed photographs have been dropped from an airplane in less than five minutes after the time of exposure.

It will be apparent to those skilled in the art that the holder herein disclosed, while particularly adapted for quick-work photography, is also an improvement over photographic holders intended for regular photographic uses. Therefore the invention is not limited to a holder specifically or exclusively adapted for quick-work photography. Moreover if the holder is to be used in the conventional manner, the passages or openings 33 and the valves 57 may be omitted. The structure of the holder otherwise remains substantially the same.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic holder for sensitized films capable of retaining such a film therein after exposure in said holder while the holder is immersed in developing, fixing and washing baths, without injury to the holder or such film, said holder being composed of material or materials effectively resisting the action of such baths and having an inner film supporting surface and opposed film-edge-engaging formations for supporting film in said holder against said surface during exposure, and also having liquid-receiving channels in the substance of and extending along said supporting surface back of the film for affording effective access of the liquids directly to such film during immersion in such baths, while so supported in said holder.

2. A photographic holder in accordance with claim 1, but in which the holder is composed of a main frame, rigid face members attached to the two opposite faces thereof, and a central film-supporting member against both faces of which sensitized films may be supported for exposure by said film-edge-engaging formations and along both which faces of said member the liquids are conducted by said channels, and for developing and fixing before removal of such films from said holder.

3. A photographic holder in accordance with claim 1, but in which the said holder is composed of plastic material including a main frame, and a rigid face member at each face thereof, and valved means permitting access of the liquids to such liquid-receiving channels.

4. A photographic holder for sensitized surfaces capable of retaining such a surface therein after exposure while the holder is immersed in developing, fixing and washing baths, without injury to the holder or such sensitized surface, said holder being composed of material or materials effectively resisting the action of such baths and having structural means for supporting such a sensitized surface therein during exposure, and also for affording effective access of the liquids to such surface during immersion in such baths, said holder being provided with an inner film-supporting member having on at least one face thereof channels for a flow of the liquids of said baths along such sensitized surface or surfaces.

5. A photographic holder for sensitized surfaces capable of retaining such a surface therein after exposure while the holder is immersed in developing, fixing and washing baths, without injury to the holder or such sensitized surface, said holder being composed of material or materials effectively resisting the action of such baths and having structural means for supporting such a sensitized surface therein during exposure, and also for affording effective access of the liquids to such surface during immersion in such baths, said holder being provided with an inner film-supporting member having on at least one face thereof channels for a flow of the liquids of said baths along such sensitized surface or surfaces, the said main frame being also provided with channels for permitting a flow of said liquids along said sensitized surface or surfaces, via the channels of said member.

6. A photographic holder for sensitized surfaces capable of retaining such a surface therein after exposure while the holder is immersed in developing, fixing and washing baths, without injury to the holder or such sensitized surface, said holder being composed of material or materials effectively resisting the action of such baths and having structural means for supporting such a sensitized surface therein during exposure, and also for affording effective access of the liquids to such surface during immersion in such baths, said holder being provided with an inner film-supporting member having on at least one face thereof channels for a flow of the liquids of said baths along such sensitized surface or surfaces, the said main frame being also provided with drainage channels for permitting a flow of said liquids via the said channels of said member along said sensitized surface or surfaces, the said inner film-supporting member having formations constituting valves to close such channels of the main frame.

7. A photographic holder for sensitized surfaces capable of retaining such a surface therein after exposure while the holder is immersed in developing, fixing and washing baths, without injury to the holder or such sensitized surface, said holder being composed of material or materials effectively resisting the action of such baths and having structural means for supporting such a sensitized surface therein during exposure, and also for affording effective access of the liquids to such surface during immersion in such baths, said holder being provided with a central film-supporting member having on at least one face thereof channels for a flow of the liquids of said baths along such sensitized surface or surfaces, the said main frame being also provided with drainage channels for permitting a flow of said liquids along said sensitized surface or surfaces via the channels of said member, the said central film-supporting member having formations constituting valves to close such channels of the main frame, the said central film-supporting member being movable in said holder into either of two positions, in one of which said valve formations close said channels of the main frame, and in the other of which said channels of the main frame are open for the flow of such liquid.

8. A photographic holder for sensitized surfaces capable of retaining such a surface therein after exposure while the holder is immersed in developing, fixing and washing baths, without injury to the holder or such sensitized surface, said holder being composed of material or materials effectively resisting the action of such baths and having structural means for supporting such a sensitized surface therein during exposure, and also for affording effective access of the liquids to such surface during immersion in such baths, said holder being provided with a central film-supporting member having on at least one face thereof channels for a flow of the liquids of said baths along such sensitized surface or surfaces, the said main frame being also provided with drainage channels for permitting a flow of said liquids along said sensitized surface or surfaces via the channels of said member, the said central film-supporting member having formations constituting valves to close such channels of the main frame, the said central film-supporting member being movable in said holder into either of two positions, in one of which said valve formations close said channels of the main frame, and in the other of which said channels of the main frame are open for the flow of such liquid, the said holder having means engageable with said central film-supporting member to retain said member in such two positions respectively.

9. A photographic holder for sensitized surfaces capable of retaining such a surface therein after exposure while the holder is immersed in developing, fixing and washing baths, without injury to the holder or such sensitized surface, said holder being composed of material or materials effectively resisting the action of such baths and having structural means for supporting such a sensitized surface therein during exposure, and also for affording effective access of the liquids to such surface during immersion in such baths, said holder being provided with a central film-supporting member having on at least one face thereof channels for a flow of the liquids of said baths along such sensitized surface or surfaces, the said main frame being also provided with drainage channels for permitting a flow of said liquids along said sensitized surface or surfaces via the channels of said member, the said central film-supporting member having formations constituting valves to close such channels of the main frame, the said central film-supporting member being movable in said holder into either of two positions, in one of which said valve formations close said channels of the main frame, and in the other of which said channels of the main frame are open for the flow of such liquid, the said holder having means engageable with said central film-supporting member to retain said member in such two positions respectively, such retaining means being spring-like latch members mounted within said holder at opposite edge portions thereof, to engage edge portions of said central film-supporting member.

10. A photographic holder for sensitized surfaces capable of retaining such a surface therein after exposure while the holder is immersed in developing, fixing and washing baths, without injury to the holder or such sensitized surface, said holder being composed of material or materials effectively resisting the action of such baths and having structural means for supporting such a sensitized surface therein during exposure, and also for affording effective access of the liquids to such surface during immersion in such baths, said holder being provided with a main frame of general rectangular form, provided at its interior with opposite longitudinal edges having groove-like formations for the reception of a central film-supporting member, and with means for holding said member in either of two positions, and at its lower, transversely extending portion provided with channels for the flow of the liquid of such baths.

11. A photographic holder for sensitized surfaces capable of retaining such a surface therein after exposure while the holder is immersed in developing, fixing and washing baths, without injury to the holder or such sensitized surface, said holder being composed of material or materials effectively resisting the action of such baths and having structural means for supporting such a sensitized surface therein during exposure, and also for affording effective access of the liquids to such surface during immersion in such baths, said holder being provided with a main frame of general rectangular form, provided at its interior with opposite longitudinal edges having groove-like formations for the reception of a central film-supporting member, and with means for holding said member in either of two positions, said holder also having lengthwise extending grooves for the reception of dark slides.

12. A photographic holder comprising a rectangular main frame, two face members attached to opposite faces thereof, a central film-supporting member received within said rectangular main frame, and provided at one or both faces thereof with opposed hook-like formations for receiving opposite edges of the film, and also provided with a film identifying tab secured to the under face of one of said hook-like formations, and under which tab a small film area near a supported edge of the sensitized film may be inserted so as to lie flatwise thereagainst, the said holder being shaped to admit light through said identifying tab or tabs onto the underlying portion of the film or films.

13. A photographic holder comprising a rectangular main frame, two face members attached to opposite faces thereof, a central film-supporting member received within said rectangular main frame, and at both faces thereof having at its upper and lower portions protruding hook-like formations under which the upper and lower ends of the film may be inserted, the said central film-supporting member secured to the under face of the upper hook-like formations at the upper end at both faces thereof a film-identifying tab, under which an edge of the corresponding film is adapted to be inserted, so as to lie flatwise against said tab, the holder being shaped to admit light through such tabs onto the underlying portions of said films.

14. A photographic holder for sensitized surfaces capable of retaining such a surface therein after exposure while the holder is immersed in developing, fixing and washing baths, without injury to the holder or such sensitized surface, said holder being composed of material or materials effectively resisting the action of such baths and having structural means for supporting such a sensitized surface therein during exposure, and also for affording effective access of the liquids to such surface during immersion in such baths, said holder being provided with a central film-supporting member received therein, the said member near its upper end being of substantially I-beam shape in cross section, and light traps or valves secured at such shaped parts of said member and co-acting with the dark slides to exclude light.

15. A photographic holder for sensitized surfaces capable of retaining such a surface therein after exposure while the holder is immersed in developing, fixing and washing baths, without injury to the holder or such sensitized surface, said holder being composed of material or materials effectively resisting the action of such baths and having structural means for supporting such a sensitized surface therein during exposure, and also for affording effective access of the liquids to such surface during immersion in such baths, said holder being provided with a central film-supporting member received therein, and provided at both faces thereof at its upper and lower portions respectively, with protruding hook-like formations facing toward each other so as to receive thereunder the upper and lower edges of the said films, the said central film-receiving member having identifying tabs under which an edge of the corresponding film may be inserted, so that light passing through said tabs causes identifying markings upon the films.

16. A photographic holder for sensitized films capable of retaining such a film therein after exposure in said holder while the holder is immersed in developing, fixing and washing baths, without injury to the holder or such film, said holder being composed of material or materials effectively resisting the action of such baths and having opposite film-edge-engaging formations for supporting such a film in said holder during exposure, and also having liquid-receiving channels for affording effective access of the liquids to such film during immersion in such baths while so supported in said holder, said holder having a main frame of general rectangular form, and a central film supporting member received in said main frame and movable therein into either of two positions, in one of which the holder becomes filled if inserted in a bath, and means for holding said member in either of said two positions in said main frame.

17. A photographic holder for sensitized films capable of retaining such a film therein after exposure in said holder while the holder is immersed in developing, fixing and washing baths, without injury to the holder or such film, said holder being composed of material or materials effectively resisting the action of such baths and having opposite film-edge-engaging formations for supporting such a film in said holder during exposure, and also having liquid-receiving channels for affording effective access of the liquids to such film during immersion in such baths while so supported in said holder, said holder having a main frame of general rectangular form, and a sensitized surface supporting member received in said main frame and movable therein into either of two positions, in one of which the holder becomes filled if inserted in a bath, and in the other of which the liquid of the bath or other material is excluded from the said sensitized surface.

18. A photographic holder in accordance with claim 17, but wherein the said sensitized surface supporting member is provided on a face thereof with one or more drainage channels for the liquid of the bath.

19. A photographic holder in accordance with claim 17, but wherein the said sensitized surface supporting member is provided on a face thereof with a series of longitudinally extending ribs providing drainage channels between them for the liquid of the bath.

20. A photographic holder in accordance with claim 17, but wherein the said sensitized surface supporting member is provided on a face thereof with a series of drainage channels for the liquid of the bath, and wherein the said main frame is provided with a series of drainage channels which are in communication with the said drainage channels of said member when said member is in the described position in which the liquid of the bath fills the holder.

21. A photographic holder in accordance with claim 17, but wherein the said sensitized surface supporting member is provided on a face thereof with a series of drainage channels for the liquid of the bath, and wherein the said main frame is provided with a series of drainage channels which are in communication with the said drainage channels of said member when said member is in the described position in which the liquid of the bath fills the holder, one of said parts (i. e. said member and said main frame) having valve formations which serve when in closed position to exclude the liquid of the bath or other material from the said sensitized surface.

22. A photographic holder in accordance with claim 17, but wherein the said sensitized surface supporting member is provided on a face thereof with a series of drainage channels for the liquid of the bath, and wherein the said main frame is provided with a series of drainage channels which are in communication with the said drainage channels of said member when said member is in the described position in which the liquid of the bath fills the holder, said member having valve formations receivable in the drainage channels of the main frame to exclude the liquid of the bath or other material from the said sensitized surface.

23. A photographic holder in accordance with claim 17, but wherein, for the purpose of so filling the said holder, at least one face of said holder is provided with a series of longitudinally extending drainage channels, and wherein the said main frame is provided at its lower end, below said holder when positioned, with a series of drainage channels to communicate with those of the holder, the latter having valve members 57 for closing communication between the said two series of drainage channels.

24. A photographic holder for sensitized surfaces capable of retaining such a surface therein after exposure in said holder while the holder is immersed in developing, fixing and washing baths, without injury to the holder or such sensitized surface, said holder being composed of material or materials effectively resisting the action of such baths and having sensitized surface-edge-engaging formations for supporting such a sensitized surface therein during exposure, and also having liquid-receiving channels for affording effective access of the liquids to such surface during immersion in such baths while so supported in said holder, said holder including a main frame of general rectangular form and a sensitized surface supporting member received in said main frame and having on a face thereof one or more such channels for the liquid of the bath.

25. A combination according to claim 24, but wherein the said face of said member is provided with a series of longitudinally extending drainage channels.

26. A combination according to claim 24, but wherein the said member is provided on a face or faces thereof with upper and lower hook-shaped formations for the reception of the upper and lower edges of a sensitized film or films.

27. A combination according to claim 24, but wherein the said member is provided on a face or faces thereof with upper and lower hook-shaped formations for the reception of the upper and lower edges of a sensitized film or films, but wherein said liquid-receiving channels extend longitudinally of the said holder, and wherein said hook-shaped formations are located between said channels.

28. A photographic holder having a main frame of open rectangular shape, and having a central film-supporting member received within said main member, and provided at both faces thereof at its upper and lower portions respectively, with protruding hook-like formations facing toward each other so as to receive thereunder the upper and lower edges of the said films, the said central film-receiving member having secured to the under faces of the said upper hook-like formations, identifying tabs under which the upper edge of the corresponding film may be inserted, so that light passing through said tabs causes identifying markings upon the films.

29. A photographic holder for sensitized films capable of retaining such a film therein after exposure in said holder while the holder is immersed in developing, fixing and washing baths, without injury to the holder or such film, said holder being composed of material or materials effectively resisting the action of such baths and having an inner film-supporting surface and opposed film-edge-engaging formations for supporting film in said holder against said surface during exposure, and also having liquid-receiving channels extending along said supporting surface for affording effective access of the liquids directly to such film during immersion in such baths, while so supported in said holder, the said holder being provided with a surface against which the said film is supported flatwise by said film-edge-engaging formations, said surface being provided for affording such effective access of the liquids, with at least one channel for the flow along said surface of the liquids of said baths in contact with the said film.

30. A photographic holder for sensitized film capable of retaining such film therein after exposure in said holder while the holder is immersed in developing, fixing and washing baths, without injury to the holder or such film, said holder being composed of material or materials effectively resisting the action of such baths and having an inner film supporting surface and opposed film-edge-engaging formations for supporting film in said holder against said surface during exposure, and also having liquid-receiving channels extending along said supporting surface for affording effective access of the liquids directly to such film during immersion in such baths, while so supported in said holder provided with two opposite film-receiving surfaces against each of which a sensitized film is adapted to be supported flatwise by said film-edge-engaging formations, each of said film-receiving surfaces being provided with a series of channels for the flow along such surface of the liquids of said baths in contact with the film supported against such surface.

31. A photographic holder for sensitized surfaces capable of retaining such a sensitized surface therein after exposure in said holder while the holder is immersed in developing, fixing and washing baths, said holder being composed of material or materials effectively resisting the action of said baths and having edge-engaging-formations for supporting such a sensitized surface in said holder during exposure, and also having at least one liquid-receiving channel for affording effective access of the liquids to such sensitized surface during immersion in such baths while so supported in said holder, said holder having a main frame of general rectangular form and an inner sensitized-surface supporting member received in said main frame and movable therein in either of two positions, in one of which the holder becomes filled if inserted in a bath, and means for holding said member in either of said two positions in said main frame.

32. A photographic holder in accordance with claim 31, but wherein the said sensitized-surface supporting member is provided on a face thereof with one or more channels for the flow of the liquid of the bath or baths.

33. A photographic holder in accordance with claim 31, but wherein the said sensitized-surface support member is provided on a face thereof with a series of channels for the flow of the liquid of the baths, and wherein the said main frame is itself provided with a series of liquid-receiving channels which are in valve-controlled communication with the said channels of the supporting member.

34. A photographic holder for sensitized surfaces capable of retaining such a surface therein after exposure in said holder while the holder is immersed in developing, fixing and washing baths without injury to the holder or such sensitized surface, said holder being composed of material or materials effectively resisting the action of said baths and being interiorly provided with a surface against which the sensitized surface is supported flatwise in the holder for such exposure, developing, etc., said inner supporting surface of the holder being itself provided with at least one channel for the effective flow for said purposes of the liquids of said baths along the so supported, said sensitized surface.

35. A photographic holder in accordance with claim 34, but wherein the said supporting surface is provided with a lengthwise extending series of such channels and intervening rib-like formations, and wherein means are provided to support the sensitized surface at edges thereof for exposure and developing, against such inner supporting surface of the holder.

BYRON L. SMITH.